United States Patent
Ford

(10) Patent No.: US 10,235,524 B2
(45) Date of Patent: Mar. 19, 2019

(54) METHODS AND APPARATUS FOR IDENTIFYING AND REMOVING MALICIOUS APPLICATIONS

(71) Applicant: SunStone Information Defense, Inc., Carmel, CA (US)

(72) Inventor: David K. Ford, Carmel, CA (US)

(73) Assignee: SUNSTONE INFORMATION DEFENSE, INC., Carmel, CA (US)

( * ) Notice: Subject to any disclaimer, the term of this patent is extended or adjusted under 35 U.S.C. 154(b) by 0 days.

(21) Appl. No.: 15/600,001

(22) Filed: May 19, 2017

(65) Prior Publication Data

US 2017/0255777 A1 Sep. 7, 2017

Related U.S. Application Data

(62) Division of application No. 13/890,865, filed on May 9, 2013, now Pat. No. 9,659,175.

(60) Provisional application No. 61/644,779, filed on May 9, 2012.

(51) Int. Cl.
*G06F 21/00* (2013.01)
*G06F 21/56* (2013.01)

(52) U.S. Cl.
CPC ......... *G06F 21/568* (2013.01); *G06F 21/566* (2013.01); *G06F 2221/2105* (2013.01)

(58) Field of Classification Search
CPC ...... G06F 21/566; G06F 21/568; G06F 21/56; G06F 21/554; G06F 2221/2105
USPC .......................................................... 726/23
See application file for complete search history.

(56) References Cited

U.S. PATENT DOCUMENTS

| | | | |
|---|---|---|---|
| 6,035,423 A | 3/2000 | Hodges et al. | |
| 7,640,589 B1 | 12/2009 | Mashevsky et al. | |
| 8,561,177 B1 | 10/2013 | Aziz et al. | |
| 9,659,175 B2 | 5/2017 | Ford | |
| 2006/0053490 A1 | 3/2006 | Herz et al. | |
| 2006/0075500 A1* | 4/2006 | Bertman ............... G06F 21/563 726/24 |

(Continued)

FOREIGN PATENT DOCUMENTS

| | | |
|---|---|---|
| EP | 2432188 A1 | 3/2012 |
| EP | 2432188 B1 | 3/2012 |

(Continued)

OTHER PUBLICATIONS

Johns, Martin. "On JavaScript malware and related threats." Journal in Computer Virology 4.3 (2008): 161-178.*

(Continued)

*Primary Examiner* — Syed A Zaidi
(74) *Attorney, Agent, or Firm* — K&L Gates LLP

(57) ABSTRACT

A system, method, and apparatus for identifying and removing malicious applications are disclosed. An example apparatus includes an executable application configured to collect data regarding processes operating on a client device during a time period. The executable application is also configured to purposefully access, during the time period, an application server using a web browser on the client device in an attempt to trigger a malicious application potentially located on the client device. The executable application is configured to transmit, after the time period, the collected data to an analysis server to determine whether the malicious application is located on the client device.

20 Claims, 14 Drawing Sheets

(56) References Cited

U.S. PATENT DOCUMENTS

| | | | |
|---|---|---|---|
| 2007/0174915 A1* | 7/2007 | Gribble | G06F 21/53 726/24 |
| 2008/0040804 A1 | 2/2008 | Oliver et al. | |
| 2008/0109473 A1 | 5/2008 | Dixon et al. | |
| 2009/0132554 A1 | 5/2009 | Nagoya | |
| 2010/0058431 A1 | 3/2010 | McCorkendale et al. | |
| 2011/0047597 A1* | 2/2011 | Mahaffey | G06F 21/564 726/3 |
| 2011/0047620 A1 | 2/2011 | Mahaffey et al. | |
| 2011/0239300 A1* | 9/2011 | Klein | G06F 21/565 726/23 |
| 2012/0005751 A1 | 1/2012 | Chen et al. | |
| 2012/0084851 A1 | 4/2012 | Neystadt et al. | |
| 2012/0216244 A1 | 8/2012 | Kumar et al. | |
| 2012/0233694 A1 | 9/2012 | Baliga et al. | |

FOREIGN PATENT DOCUMENTS

| | | |
|---|---|---|
| WO | WO-2013/170064 A2 | 11/2013 |
| WO | WO-2013/170064 A3 | 11/2013 |

OTHER PUBLICATIONS

Bose, Abhijit, et al. "Behavioral detection of malware on mobile handsets." Proceedings of the 6th international conference on Mobile systems, applications, and services. ACM, 2008.

Brumley, David, et al. "Automatically identifying trigger-based behavior in malware." Botnet Detection. Springer US, 2008. 65-88.

Masud, Mohammad M., et al. "Flow-based identification of botnet traffic by mining multiple log files." Distributed Framework and Applications, 2008. DFmA 2008. First International Conference on. IEEE, 2008.

Nadji, Yacin, Jonathon Giffin, and Patrick Traynor. "Automated remote repair for mobile malware." Proceedings of the 27th Annual Computer Security Applications Conference. ACM, 2011.

Yin, Heng, et al. "Panorama: capturing system-wide information flow for malware detection and analysis." Proceedings of the 14th ACM conference on Computer and communications security. ACM, 2007.

International Preliminary Report on Patentability, dated Jul. 3, 2014, for corresponding Intl. Application No. PCT/US2013/40394.

International Search Report and Written Opinion dated Dec. 6, 2013 for corresponding Intl. Application PCT/US2013/040394.

* cited by examiner

*← 500*

| COLLECTION FILE | | | |
|---|---|---|---|
| PROCESS NAME | START TIME | DURATION | TRIGGER |
| PROCESSXYZ.EXE | 12:00 | 100 MS | NO |
| PROCESSaaa.EXE | 12:00 | 20 MS | NO |
| PROCESSORD.EXE | 12:00 | 50 MS | NO |
| PROCESSSFO.INI | 12:01 | 250 MS | NO |
| ⋮ | | | |
| BROWSER.EXE | 12:02 | 70000 MS | YES |
| PROCESSXYZ.EXE | 12:02 | 100 MS | NO |
| MALWARE.INI | 12:02 | 25 MS | NO |
| PROCESSaaa.EXE | 12:03 | 30 MS | NO |
| MALWARE.INI | 12:03 | 45 MS | NO |

FIG. 9

METHODS AND APPARATUS FOR IDENTIFYING AND REMOVING MALICIOUS APPLICATIONS

PRIORITY CLAIM

The present application is a divisional of, claims priority to and the benefit of U.S. patent application Ser. No. 13/890,865, filed on May 9, 2013, now U.S. Pat. No. 9,659,175, which claims priority to and the benefit of U.S. Provisional Patent Application No. 61/644,779, filed on May 9, 2012, the entirety of which are incorporated herein by reference.

BACKGROUND

Viruses and other malicious applications are increasingly being used to steal information from client devices, such as mobile phones, in an attempt to gain improper access to sensitive and protected client data. Conventional virus detection software often works by scanning downloads of files being stored on a client device to detect known viruses or malicious applications. In an alternative approach, malicious applications or viruses are detected behaviorally based on known common traits or signatures.

However, an issue with these known approaches is that the common traits, signatures, or definitions have to be known by the virus detection software. Further, the virus detection software has to include instructions for removing each specific malicious application. In other words, conventional known virus detection software is oftentimes reactive to because time is needed to analyze malicious applications prior to characterizing traits and determining a removal solution. Approaches to diagnose, remove, or contain such viruses and malicious applications without necessarily having identified the particular virus or virus signature are described in the present disclosure.

SUMMARY

The present disclosure provides a new and innovative system, method, and apparatus for identifying and removing malicious applications from client devices. In an embodiment, an executable application is installed on a client device responsive to an application server detecting suspicious activity from the client device. The executable application applies triggering events or stimuli and records processes of the client device. The triggering events are designed to cause a malicious application to perform operations, including reading, writing, data transmission, etc. The triggering events can include accessing a website or server, reading data, writing data, etc. After a time period (e.g., minutes, hours, days, etc.), the executable application transmits a data structure of the recorded processes to an analysis server.

In this embodiment, the analysis server analyzes the recorded processes to determine which processes began within a time period of an applied triggering event. The analysis server also compares the processes to processes of a clean device (e.g., a device unaffected by malicious applications) that is similar to the client device. The analysis server uses the comparison and analysis to identify processes that are most likely associated with a malicious application. The analysis server determines files on the client device that are associated with the detected processes and instructs the infected client device to remove or otherwise quarantine the determined files to stop the operation of the malicious application.

In an example method, an executable application operating on a client device is configured to place the client device into a quiescent state, collect data regarding processes operating on the client device, and access an application server from the client device and perform at least one data operation. The executable application also transmits the collected data to an analysis server. The example analysis server analyzes the collected data to identify a malicious application by determining which processes on the client device were triggered after the application server was accessed by the executable application and comparing the determined processes to records of processes from a device similarly configured as the client device to identify processes associated with the malicious application. The analysis server also determines files on the client device that are associated with the identified malicious application and based on the analysis of the collected data, transmits instructions to the executable application on the client device causing the executable application to remove the malicious application from operation on the client device Additional features and advantages of the disclosed system, method, and apparatus are described in, and will be apparent from, the following Detailed Description and the Figures.

BRIEF DESCRIPTION OF THE FIGURES

FIG. 9 illustrates an example data structure of collected data of processes operating on a client device, according to an example embodiment of the present invention.

DETAILED DESCRIPTION

Figure 1:
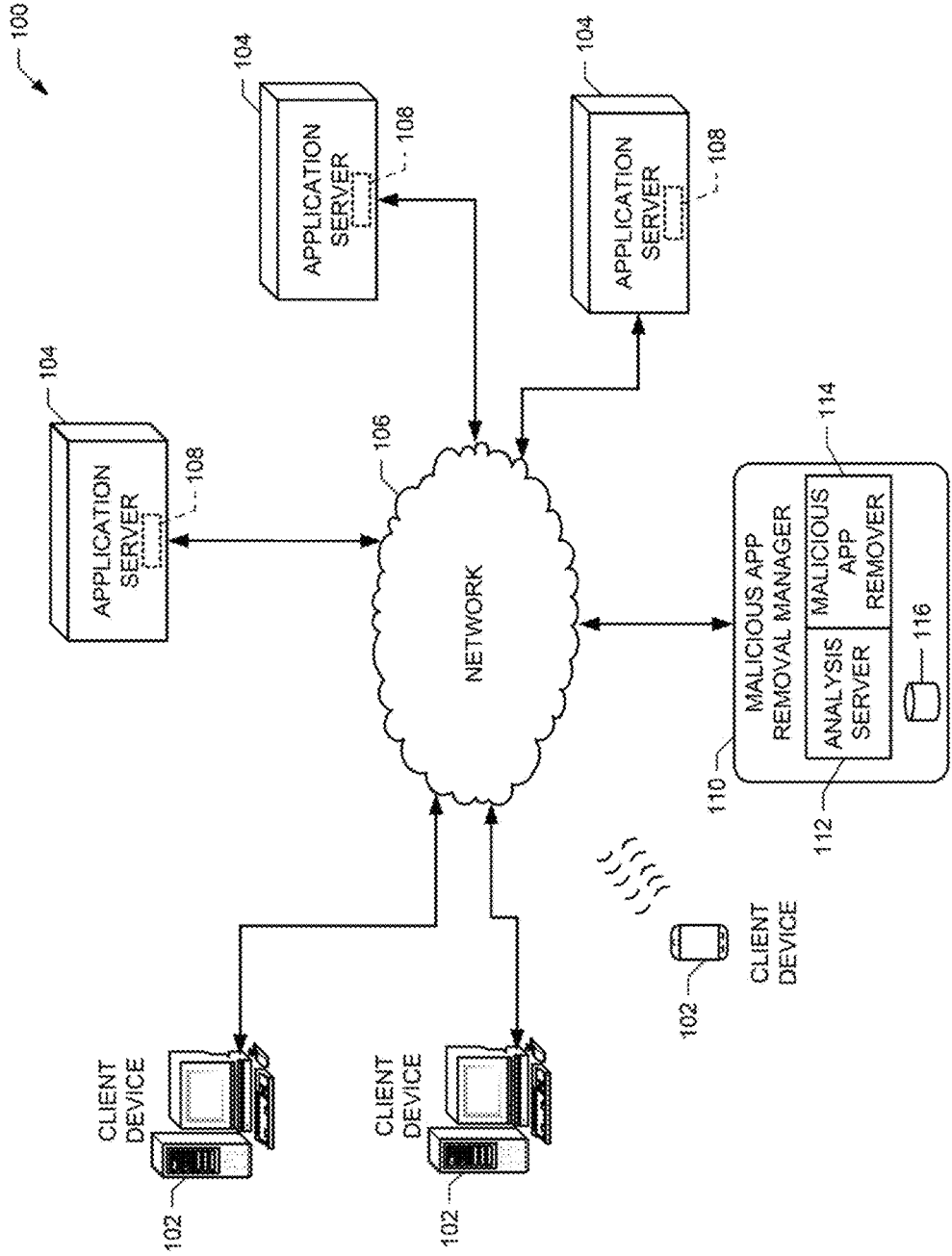
FIG. 1 shows a block diagram of an example network communicating system, according to an example embodiment of the present invention.

The present disclosure relates in general to a method, apparatus, and system to protect client devices from malicious applications and, in particular, to identify and remove malicious applications from client devices. Briefly, in an example embodiment, a system is provided that determines when a malicious application is affecting communications between a client device and an application server. After detecting such an issue, the example system initiates an executable application on the client device. The example executable application attempts to trigger, invoke, or otherwise stimulate malicious application(s) on the client device by accessing application server(s) (e.g., a banking or e-commerce website). While accessing a server, the executable application collects information regarding processes operating on the client device. After the executable application has made at least one attempt to stimulate the malicious application, the executable application transmits the collected data to an analysis server.

The example analysis server identifies the malicious application by determining which processes on the client device begin shortly after the executable application accessed the application server (i.e., executing triggering events or stimuli). The example analysis server also compares the processes to records of processes operating on devices that have a similar configuration as the client device. The purpose of this comparison is to identify deltas between a known clean device and the client device with the malicious application. After identifying the operational characteristics of the malicious application in response to the stimuli, the analysis server determines how the malicious application should be handled and transits instructions to the executable application to remove or otherwise isolate the malicious application on the client device.

Currently, many antivirus programs use one of several methods to prevent, identify, and remove malicious applications from a client device. These methods generally include signature based detection, heuristic based detection, and file emulation. Signature based detection uses antivirus software that includes a library of thousands or millions of definitions, file names, variations, etc. (i.e., signatures) of known malicious applications. The antivirus software scans files of a client device using the library to identify any malicious applications. In some instances, the software scans data in a staging area prior to the software allowing the data to be realized (e.g., installed or saved) on a client device. In other instances, the software scans already saved files and data on a client device. In either of these instances, the software removes or quarantines any detected malicious applications. However, signature based detection requires that the signature of a malicious application be known. This means that the malicious application library has to be updated constantly as new malicious applications are newly detected.

Heuristic based detection typically uses statistical-based algorithms to identify common traits of malicious applications, which are defined as a generic signature. The antivirus software then compares files on a client device or files to be downloaded onto a client device to generic signatures to identify malicious applications. However, depending on the balance of the algorithm, this approach may generate many false positives or false negatives in regard to actual malicious application detection.

File emulation attempts to trigger a malicious application by simulating a file open or website access to determine if the file or website opens with unusual behavior. This includes opening a file on a virtual machine, honeypot, sandbox, or any other isolated operating environment. For example, some file emulation software scans files before they are installed on a client device or scans webpages before they are loaded onto a client device. This software temporally installs the newly downloaded file into an isolated area of a processor or a remote proxy server and tests the file for unusual behavior that is typically not associated with the file type.

For instance, emulation software may detect that a file contains a malicious application if the software detects that a file opens in an unusual way for that type of file. In another instance, emulation proxy software may detect that contents of a website contain a malicious application if the website contents perform unusual features (e.g., transmit data to another website, Internet Protocol ("IP") address, or server) when a webpage of the website is opened. In both examples, the emulation software tests only the file or the website. The software does not operate an application designed to directly execute the embedded file or directly access and/or operate hidden and/or unwanted content in the webpage and related (potentially hidden) downloads.

While file emulation has been effective at preventing malicious applications from being installed on a client device, this method is not effective at removing an already installed malicious application. Further, malicious applications are becoming increasingly more sophisticated to detect when they are being tested in a file emulator. As a result, these malicious applications may not trigger when they are in the emulator or, alternatively, may not operate for a specified number of days or until after a number of trigger attempts to avoid being detected.

The example method, apparatus, and system disclosed herein overcome at least some of these issues by identifying a malicious application by providing the malicious application with its designed objective (e.g., to steal credentials and other sensitive information). Many malicious applications are designed to steal personal information and manipulate Internet transactions. For example some malicious applications are designed to steal authentication credentials from a legitimate client device while the device is connected to a social networking website, banking website, or an e-commerce website. In other examples, malicious applications are designed to engage in fraudulent activity while a legitimate client device is engaged in e-commerce or other types of data transactions with a specific website or data server. A common trait of these malicious applications is that they are triggered when a client device accesses certain websites that require authentication to protect a client's personal data.

The example method, apparatus, and system disclosed herein take advantage of these common traits to identify and remove malicious applications. Experimentation using the example method, apparatus, and system disclosed herein has shown that most malicious applications are stimulated (e.g., become active to achieve an instructed purpose) within a couple of milliseconds of a client device accessing an application server. The example method, apparatus, and system disclosed herein purposefully stimulate a malicious application by accessing a third-party application server that is an intended target of the malicious application. The example method, apparatus, and system disclosed herein record which processes operating on the client device are triggered shortly after accessing the application server. In other words, the example method, apparatus, and system disclosed herein use the intended purpose of malicious applications as a basis for removing or quarantining them.

Throughout the disclosure, reference is made to malicious applications (e.g., malware), which can include any computer virus, computer worm, Trojan horse, rootkit, spyware, adware, or any other malicious or unwanted software installed on a client device. Additionally, throughout the disclosure, reference is made to client devices, which can include any cellphone, smartphone, personal digital assistant ("PDA"), mobile device, tablet computer, computer, laptop, server, processor, console, gaming system, multimedia receiver, or any other computing device.

The present system may be readily realized in a network communications system. A high level block diagram of an example network communications system 100 is illustrated in FIG. 1. The illustrated system 100 includes one or more client devices 102, and one or more application servers 104. The client devices 102 access data, services, media content, and any other type of information located on or hosted by the application servers 104.

The client devices 102 communicate with the application servers 104 via a connection to one or more communications channels 106 such as the Internet or some other data network, including, but not limited to, any suitable wide area network or local area network. It should be appreciated that any of the devices described herein may be directly connected to each other instead of over a network. The network 106 may also support wireless communication with wireless client devices 102.

Typically, application servers 104 store one or more of a plurality of files, programs, data structures, databases, and/or web pages in one or more memories for use by the client devices 102, and/or other application servers 104. An application server 104 may be configured according to its particular operating system, applications, memory, hardware, etc., and may provide various options for managing the execution of the programs and applications, as well as various administrative tasks. An application server 104 may interact via one or more networks with one or more other application servers 104, which may be operated independently.

The example application servers 104 provide data and services to the client devices 102. The application servers 104 may be managed by one or more service providers, which control the information and types of services offered. These services providers also determine qualifications as to which client devices 102 are authorized to access the application servers 104. The application servers 104 can provide, for example, banking services, online retain services, social media content, multimedia services, government services, educational services, etc.

Additionally, the application servers 104 may provide control to processes within a facility such as a process control system. In these instances, the application servers 104 provide client devices 102 with access to read, write, or subscribe to data and information associated with specific processes. For example, the application servers 104 may provide information and control to the client devices 102 for an oil refinery or a manufacturing plant. In this example, a user of the client device 102 can access an application server 104 to view statuses of equipment within the plant and/or to set controls for the equipment within the plant.

While the application servers 104 are shown as individual entities, each application server 104 may be partitioned or distributed within a network. For instance, each application server 104 may be implemented within a cloud computing network with different processes and data stored at different servers or processors. Additionally, multiple servers or processors located at different geographic locations may be grouped together as an application server 104. In this instance, network routers determine which client device 102 connects to which processor within the application server 104.

In the illustrated example of FIG. 1, each of the application servers 104 include a security processor 108. The security processor 108 monitors communications between the client devices 102 and the respective application server 104 for suspicious activity. The monitoring may include detecting errors in a communication channel between a client device 102 and an application server 104 using, for example, the methods and system disclosed in U.S. Patent Publication No. 2013/0073853, now U.S. Pat. No. 9,122, 870, titled "Methods and Apparatus for Validating Communications in an Open Architecture System", the entirety of which is incorporated herein by reference.

In an example, the security processor 108 makes a best guess as to a location of a 'Submit' icon on a fully rendered webpage displayed on a client device 102. This icon is part of a banking website provided by application server 104. The security processor 108 monitors a response by the client device 102 to identify coordinates of a mouse click of the 'Submit' icon. The security processor 108 then determines that a malicious application is affecting communications if the best guess does not match the reported coordinates of the mouse click on the icon. The example security processor 108 may also determine that a malicious application is affecting communications using any other malicious application detection program or software.

In response to detecting a malicious application, the security processor 108 notifies the appropriate application servers 104 and transmits an executable application to the appropriate client device 102. The executable application is configured to provide a malicious application invoking stimuli and record operations and processes operating on the client device 102. In this instance, the executable application installs itself on the client device 102 and accesses the same application server 104 while recording data as to which processes are active on the client device 102 during the access. The executable application then transmits the recorded data for analysis. The executable application is described in greater detail in conjunction with FIGS. 3 to 7.

In other embodiments, the executable application may be installed on the client devices 102 prior to the detection of suspicious activity by the security processor 108. For example, the executable application maybe downloaded by a user from an online merchant (e.g., an app store) or after accessing an online merchant (e.g., a banking website). In other examples, the executable application may be pre-installed on the client devices 102 at manufacture.

The example network communication system 100 of FIG. 1 also includes a malicious application removal manager 110. The example malicious application removal manager 110 includes an analysis server 112 configured to analyze data collected by an executable application. The analysis server 112 identifies a malicious application by determining which processes on the client device 102 began operating or operated directly after (e.g., a few milliseconds to a few minutes) an executable application accessed an application server 104. The analysis server 112 may also compare processes on the client device 102 to records of processes of known clean devices (e.g., a device without the malicious application) with similar operating parameters and configurations, which are stored in database 116.

The example malicious application removal manager 110 may also include a malicious application remover 114 to identify all files, executables, libraries, code, and any other item associates with a malicious application on a client device 102. The malicious application remover 114 removes or otherwise quarantines these identified files and folders on a client device 102 by transmitting at least one instruction to the executable application. The executable application uses the instruction to remove or quarantine the malicious application and validates that the removal was successful. The executable application may validate the removal by accessing an application server 104 to execute triggering events or stimuli and then transmit the collected data to the malicious application removal manager 110.

In the example embodiment of FIG. 1, the malicious application removal manager 110 is shown as being separate from the application servers 104 and the security processors 108. In some examples, each application server 104 may include a malicious application removal manager 110. Alternatively, a malicious application removal manager 110 may exist for each different application server 104.

Example Processor

Figure 2:
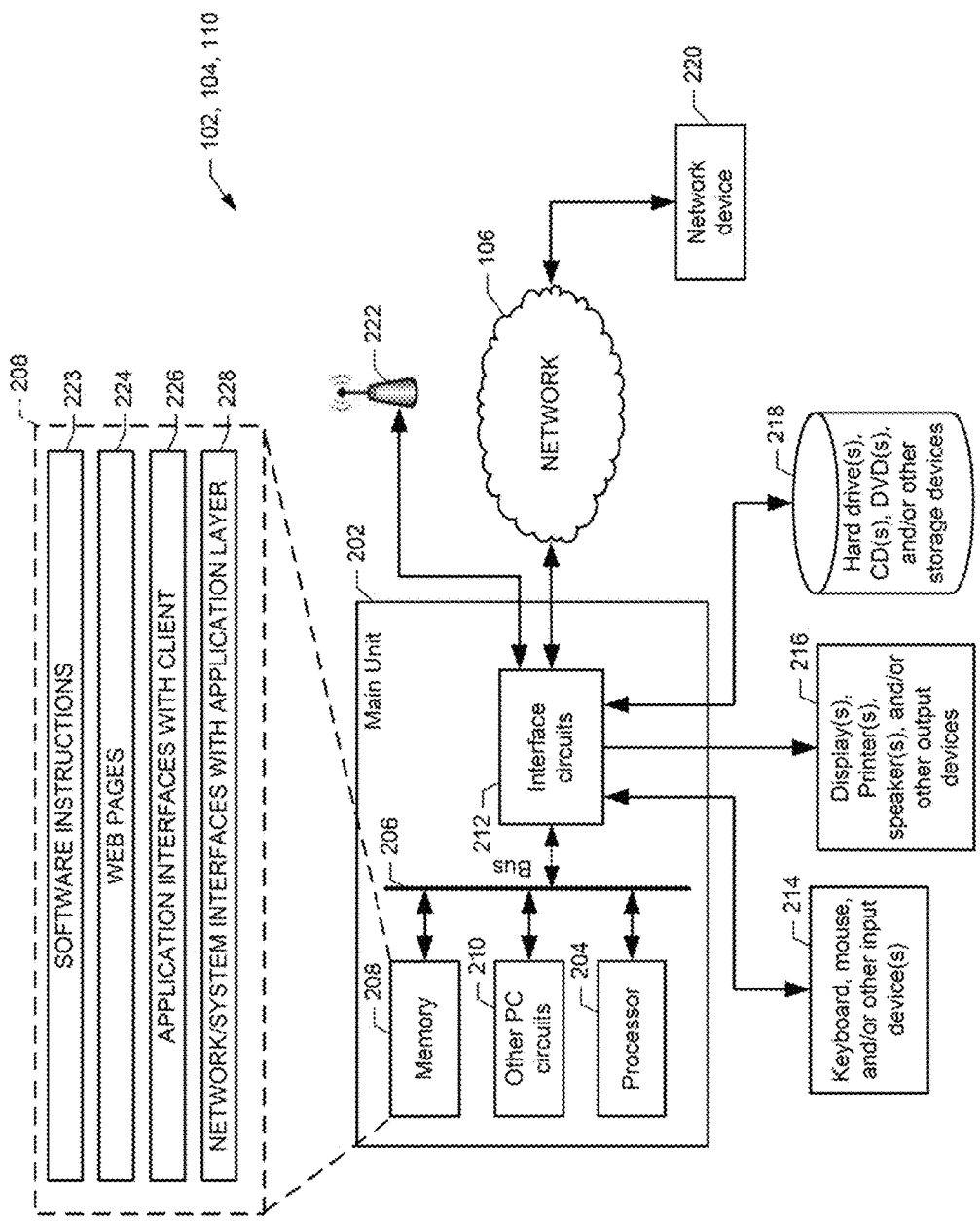
FIG. 2 illustrates a detailed block diagram including an example of a client device, according to an example embodiment of the present invention.

A detailed block diagram of electrical systems of an example computing device (e.g., a client device 102, an application server 104, and/or the malicious application removal manager 110) is illustrated in FIG. 2. In this example, the computing device 102, 104, 110 includes a main unit 202 which preferably includes one or more processors 204 communicatively coupled by an address/data bus 206 to one or more memory devices 208, other computer circuitry 210, and one or more interface circuits 212. The processor 204 may be any suitable processor, such as a microprocessor from the INTEL PENTIUM® or CORE™ family of microprocessors. The memory 208 preferably includes volatile memory and non-volatile memory. Preferably, the memory 208 stores a software program that interacts with the other devices in the system 100, as described below. This program may be executed by the processor 204 in any suitable manner. In an example embodiment, memory 208 may be part of a "cloud" such that cloud computing may be utilized by a computing devices 102, 104, and 110. The memory 208 may also store digital data indicative of documents, files, programs, web pages, etc. retrieved from a computing device 102, 104, 110 and/or loaded via an input device 214.

The example memory devices 208 store software instructions 223, webpages 224, malicious application detection algorithms, user interface features, permissions, protocols, configurations, and/or preference information 226. The memory devices 208 also may store network or system interface features, permissions, protocols, configuration, and/or preference information 228 for use by the computing devices 102, 104, and 110. It will be appreciated that many other data fields and records may be stored in the memory device 208 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, image sensor, character recognition, barcode scanner, microphone, and/or a speech or voice recognition system.

One or more displays, printers, speakers, and/or other output devices 216 may also be connected to the main unit 202 via the interface circuit 212. The display may be a cathode ray tube (CRTs), a liquid crystal display (LCD), or any other type of display. The display generates visual displays generated during operation of the computing device 102, 104, and 110. For example, the display may provide a user interface and may display one or more webpages received from a computing device 102, 104, and 110. A user interface may include prompts for human input from a user of a client device 102 including links, buttons, tabs, checkboxes, thumbnails, text fields, drop down boxes, etc., and may provide various outputs in response to the user inputs, such as text, still images, videos, audio, and animations.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as pricing data, transaction data, operations data, inventory data, commission data, manufacturing data, marketing data, distribution data, consumer data, mapping data, image data, video data, audio data, tagging data, historical access or usage data, statistical data, security data, etc., which may be used by the computing device 102, 104, 110.

The computing device 102, 104, and 110 may also exchange data with other network devices 220 via a connection to the network 106 or a wireless transceiver 222 connected to the network 106. Network devices 220 may include one or more servers (e.g., the application servers 104), which may be used to store certain types of data, and particularly large volumes of data which may be stored in one or more data repository. A server may include any kind of data including databases, programs, files, libraries, pricing data, transaction data, operations data, inventory data, commission data, manufacturing data, marketing data, distribution data, consumer data, mapping data, configuration data, index or tagging data, historical access or usage data, statistical data, security data, etc. A server may store and operate various applications relating to receiving, transmitting, processing, and storing the large volumes of data. It should be appreciated that various configurations of one or more servers may be used to support and maintain the system 100. For example, servers may be operated by various different entities, including sellers, retailers, manufacturers, distributors, service providers, marketers, information services, etc. Also, certain data may be stored in a client device 102 or the malicious application removal manager 110, which is also stored on a server, either temporarily or permanently, for example in memory 208 or storage device 218. The network connection may be any type of network connection, such as an Ethernet connection, digital subscriber line (DSL), telephone line, coaxial cable, wireless connection, etc.

Access to a computing device 102, 104, and 110 can be controlled by appropriate security software or security measures. An individual user's access can be defined by the computing device 102, 104, and 110 and limited to certain data and/or actions. Accordingly, users of the system 100 may be required to register with one or more computing devices 102, 104, and 110.

Example Process to Identify and Remove Malicious Applications

Figure 3:
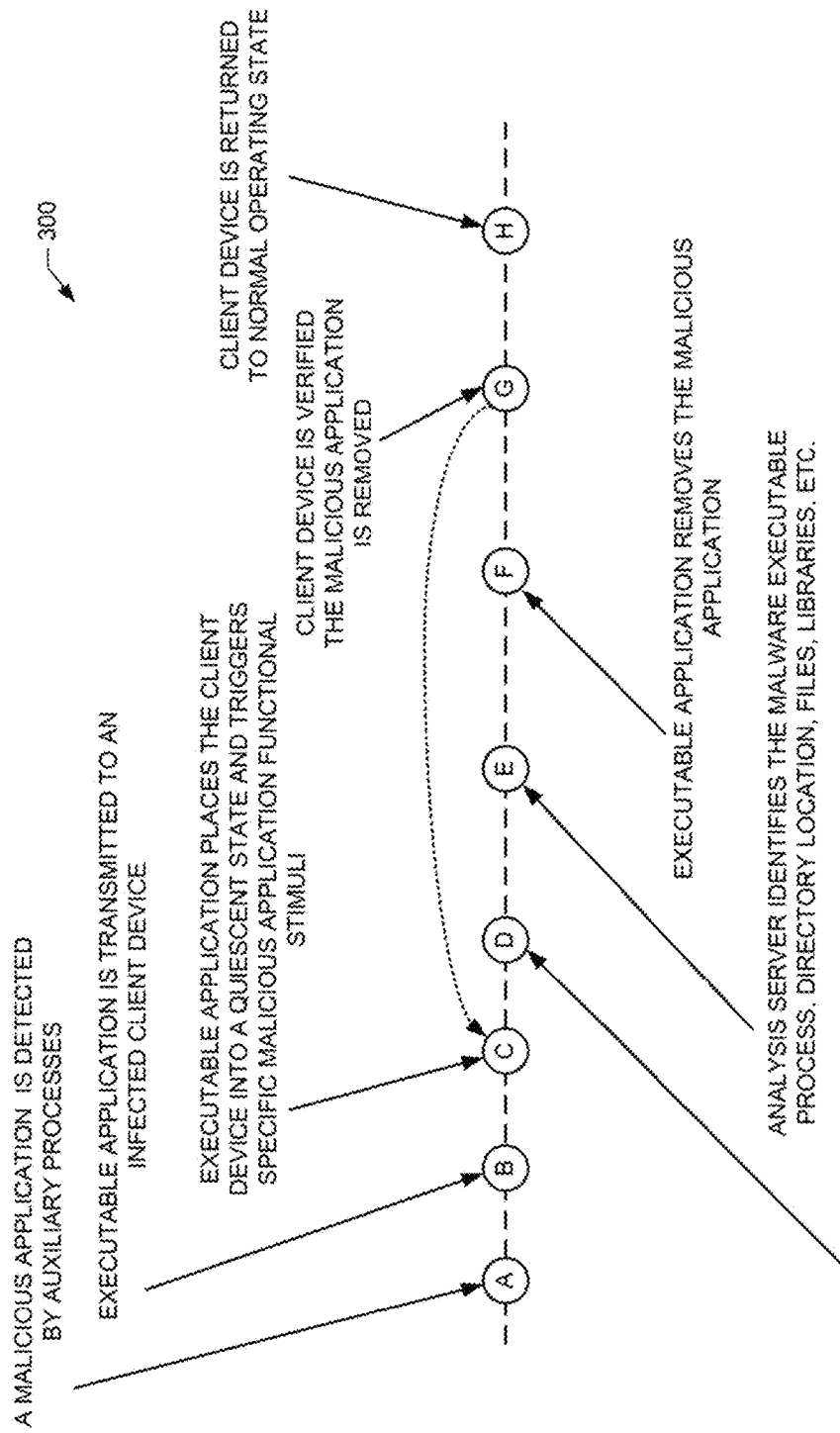
FIG. 3 shows an event flow diagram including an example procedure to identify and remove malicious applications, according to an example embodiment of the present invention.

FIG. 3 is a system level event flow diagram showing an example procedure 300 to identify and remove malicious applications. While the Events A to H are shown as occurring in series, in other embodiments, at least some of the Events may occur in parallel or may occur more than once.

In other embodiments, the example procedure 300 may include additional or fewer events.

Event A—Detection

Figure 4:
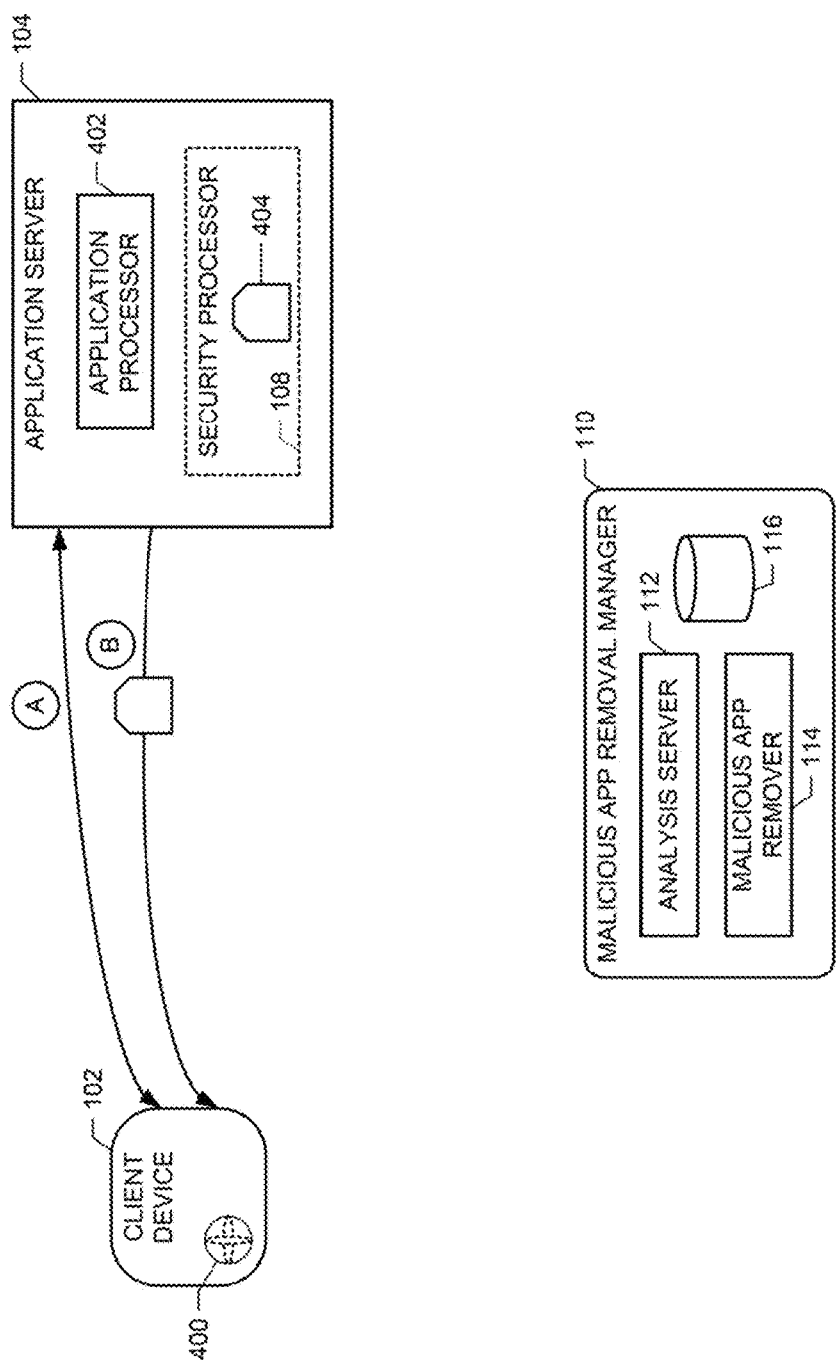
FIGS. 4 to 7 show functional block diagrams including the example procedure of FIG. 3 to identify and remove malicious applications, according to an example embodiment of the present invention.

The procedure 300 begins at Event A, where a malicious application is detected by an application server 104. FIG. 4 shows that Event A occurs during normal communications or transactions between client device 102 and application server 104. During Event A, the client device 102 communicates with an application processor 402 of the server 104 to receive, view, modify, or provide data.

The example security processor 108 monitors for malicious applications by, for example, injecting code into a webpage accessed by the client device 102. The security processor 108 monitors responses from the client device 102 to determine whether the webpages were tampered with or modified. The security processor 108 detects a malicious application if it determines a webpage has been modified. The security processor 108 may also use other antivirus processes to detect a malicious application such as, for example, searching for signatures in data transfer that correspond to malicious applications.

While FIG. 4 shows the security processor 108 as being separate from the application processor 402 of the application server 104, in other embodiments the application processor 402 may include security software that performs the functions of the security processor 108. In yet other embodiments, the security processor 108 may be integrated with the application processor 402 or may remotely access the application processor 402 from a different geographic location (e.g., cloud computing security).

At Event A, the security processor 108 detects a presence of malicious application 400 on client device 102. However, the security processor 108 does not have information as to the identity of the malicious application 400, which files are associated with the malicious application 400, and/or what other processes are affected by the malicious application 400. To identify the malicious application 400, the security processor 108 transmits, via the application server 104, an executable application 404 to the client device 102, which is denoted as Event B.

It should be appreciated that in other embodiments the executable application 404 may already be installed on the client device 102. In these other embodiments, the executable application 404 may separately detect a malicious application. Additionally or alternatively, the executable application 404 operates in conjunction with the security processor 108 to detect a malicious application.

Event B—Installation of an Executable Application

At Event B (shown in FIGS. 3 and 4), the client device 102 receives and installs the example executable application 404. The executable application 404 includes code or instructions that can be installed in an application layer, kernel level, or operating system level of the client device 102. In some embodiments, the executable application 404 may be embedded within hardware (e.g., an application specific integrated circuit) of the client device 102 or, alternatively, may be previously installed at the client device 102. In these examples, the security processor 108 may transmit at least one message to the client device 102 instructing the executable application 404 to begin operating.

In an embodiment, the executable application 404 may be an extension of a Windows Driver Model that is compatible with Windows Management Instrumentation ("WMI"). In this example embodiment, the executable application 404 contains code that defines a proprietary set of specifications that enables at least the executable application 404 to: 1) obtain control of the client device 102; 2) collect information regarding software and hardware processes operating on the client device 102; and 3) use transmission protocols associated with interfaces in the client device 102 to transmit collected data to analysis server 112.

In other embodiments, the executable application 404 may enable either the security processor 108 or the malicious application removal manager 110 to assume remote control of the client device 102. In these embodiments, the security processor 108 or the malicious application removal manager 110 may use Distributed Component Object Model (DCOM), Simple Access Protocol (SOAP), etc. to remotely instruct the client device 102 to collect process information, perform transactions to trigger a malicious application, and transmit the collected information. These embodiments may be implemented in instances where a client device 102 is not capable or not available to install a full version of an executable application 404.

Events C and D—Data Collection of Malicious Applications

Figure 5:
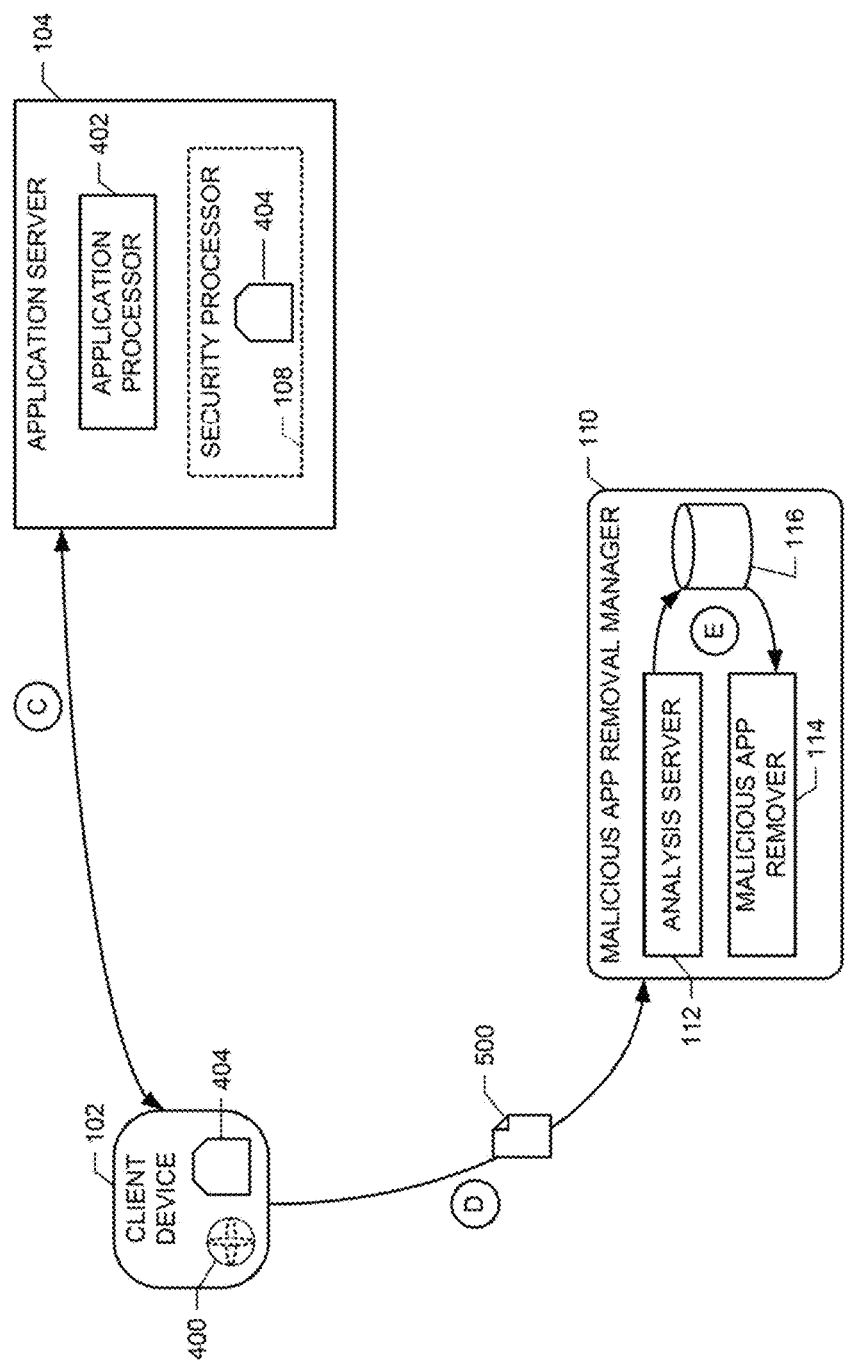

After installing an executable application 404, the example procedure 300 begins collecting process information from the client device 102, as shown in Event C in FIGS. 3, 5, and 9. To collect process data, the executable application 404 places the client device 102 into a quiescent state to reduce a number of operating processes. Generally, client devices 102 may have at least 40 to 50 background processes operating during a data collection period. In some instances, the executable application 404 may prompt a user of the client device 102 to grant control to the application 404. In other instances, the executable application 404 may operate in the background without a user being aware.

The executable application 404 begins collecting process data by receiving information from a task manager (e.g., a Windows Application Programmable Interface ("WINAPI")) of the client device 102 identifying which processes are operating. The task manager can provide at least twenty-three performance data metrics for each of the processes. The collected process data is stored to a data structure 500. The information stored can include, for example, a file name of the process (e.g., an executable file), a time the process started, duration of the process, and any other identifying information regarding the process. The executable application 404 may flag in the data structure 500 triggering processes or stimuli associated with accessing the application server 104.

Once the executable application 404 has begun collecting data, the application 404 accesses the application processor 402 of the application server 104. In this example, the executable application 404 accesses the same application server 104 that detected the malicious application 400. The application 404 accesses the same server 104 because the prior detection by the server 104 implies that the malicious application 400 is triggered by transactions with this particular server 104. In other examples, the executable application 404 may access other predetermined application servers 104.

When the executable application 404 accesses the server 104, the application 404 performs a series of data reads, writes, file opens, and other Internet transactions. At the same time, the executable application 404 flags in the data structure 500 the processes performed as triggers or stimuli. While the executable application 404 is accessing the application server 104, the security processor 108 informs that application server 104 that the transactions are for malicious application detection. This prevents the application server 104 from carrying out the transactions.

In an example, the executable application 404 accesses a banking website. To trigger a malicious application, the executable application 404 accesses a log-in page and provides credentials of a user of the client device 102. In some embodiments, the credentials are not associated with the user (e.g., simulated credentials). In other embodiments, the credentials could be associated with an account of the user.

The executable application 404 then operates a routine that instructs the application processor 402 to perform a banking transaction by transferring funds from a savings account to a checking account. The executable application 404 then confirms the transaction was successful and logs out of the website. While the application processor 402 appeared to perform the transactions from the perspective of the malicious application 400, the application processor 402 really discarded, failed to process, or carry-out the transactions. As a result, the executable application 404 protects a user's data while enabling the malicious application to believe the data was compromised.

The example security processor 108 determines which communications are associated with the executable application 404 based on identifiers embedded within the transactions that indicate the transactions originated from the executable application 404. In some instances, the security processor 108 may assign the identifiers to the executable application 404 prior to transmitting the executable application 404 to the client device 102. In other instances, the security processor 108 may have a record of signatures or specific webpage modifiers that correspond to executable applications 404. These signatures may enable an executable application to separately access application servers 104 from the one that detected the malicious application 400.

After the executable application 404 has attempted a specified number of triggers or stimuli with the application server 104, the application 404 ends data collection. An example of a data structure 500 is shown in FIG. 9. This data structure 500 includes names of processes, as reported by a task manager at a kernel or operating system level, times the processes were active, and a flag indicating which processes are designated triggers. In other examples, the data structure 500 can include additional performance data metrics that are collected by a WINAPI. In this embodiment, the executable application 404 may set flags to indicate a process trigger. In other examples, the trigger flag may be omitted. In these examples, the trigger events of stimuli may be transmitted in a separate data structure or file or appended to the data structure 500 by the executable application 404.

In the illustrated example of FIG. 9, the trigger process corresponds to the BROWSER.EXE file. This file launches a web browser and performs one or more data transactions with an application server 104. In some examples, the process associated with the BROWSER.EXE file may additionally include a web address of the application server 104, a record of the data transactions, and times of the data transactions.

Event C of procedure 300 ends when the executable application 404 transmits the data structure 500 to the malicious application removal manager 110, designated as Event D. The data collection file may be encrypted and transmitted through, for example, the network 106. The data structure 500 is transmitted to a remote malicious application removal manager 110 to prevent the malicious application 400 from stopping or tampering with the analysis, identification, and removal. In some examples, the executable application 404 may also obfuscate and/or encrypt information in the data structure 500 to prevent the malicious application 400 from detecting it is being monitored or to prevent tampering.

Event E—Identification of Malicious Applications

After receiving a data structure 500, the example procedure 300 of FIG. 3 performs Event E to identify a malicious application 400. FIG. 5 shows that Event E is first performed by the analysis server 112 to determine triggering stimuli within the data structure 500. For example, the analysis server 112 may analyze the data structure 500 of FIG. 9 and identify the trigger stimuli based on the trigger flags. In other examples, the analysis server 112 may include a library of triggering stimuli (e.g., records of triggering websites, data reads, writes, file opens, authentications, etc.) and search for these stimuli within the data structure 500.

The analysis server 112 uses the identified triggering events to narrow the search for malicious applications 400. Experimentation using the example procedure 300 has demonstrated that malicious applications generally activate within a few milliseconds to a few seconds after triggering stimuli. As a result, the analysis server 112 is configured to identify which processes of the client device 102 began directly after a trigger event. This helps narrow down the 40 to 50 background processes operating on a client device 102 to processes that are somehow associated with a triggering event. In the example data structure 500 of FIG. 9 where BROWSER.EXE was the trigger event, the filtered processes include PROCESSXYZ.EXE, MALWARE.INI, and PROCESSaaa.EXE.

Once the number of processes of concern has been reduced, the example analysis server 112 of FIG. 5 accesses the database 116 to compare these processes to records of processes of uninfected client devices. The example database 116 includes a precompiled library of records for clean client devices with varying operating system versions, architectures, configurations, hardware versions, etc. The database 116 includes records of processes for these clean client devices engaging in similar activities (such as accessing the same websites) as the client devices 102.

For example, in FIG. 5, the database 116 includes a record of a clean client device with a similar configuration to the client device 102 performing the same set of transactions with the application server 104. This enables the analysis server 112 to identify differences or deltas between the processes of the client device 102 and processes of a clean device. Any differences or deltas are classified by the analysis server 112 as processes corresponding to malicious applications 400. In the example of FIG. 9, the analysis server 112 determines that process MALWARE.INI is absent from a record of processes of a clean device and labels this process as a malicious application 400.

Figure 10:
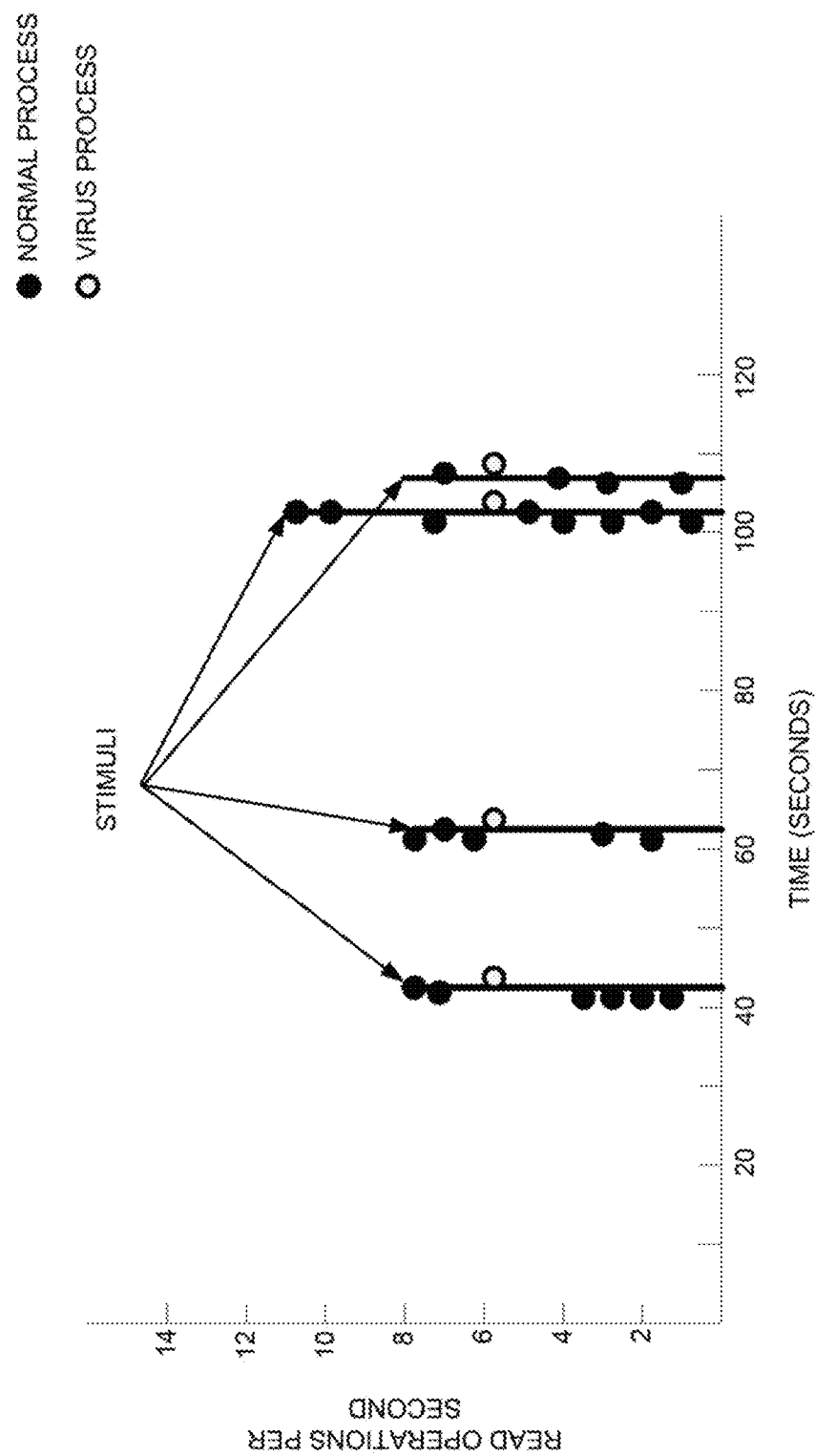
FIGS. 10 to 12 show graphs of a malicious application being triggered by stimuli, according to an example embodiment of the present invention.
Figure 11:
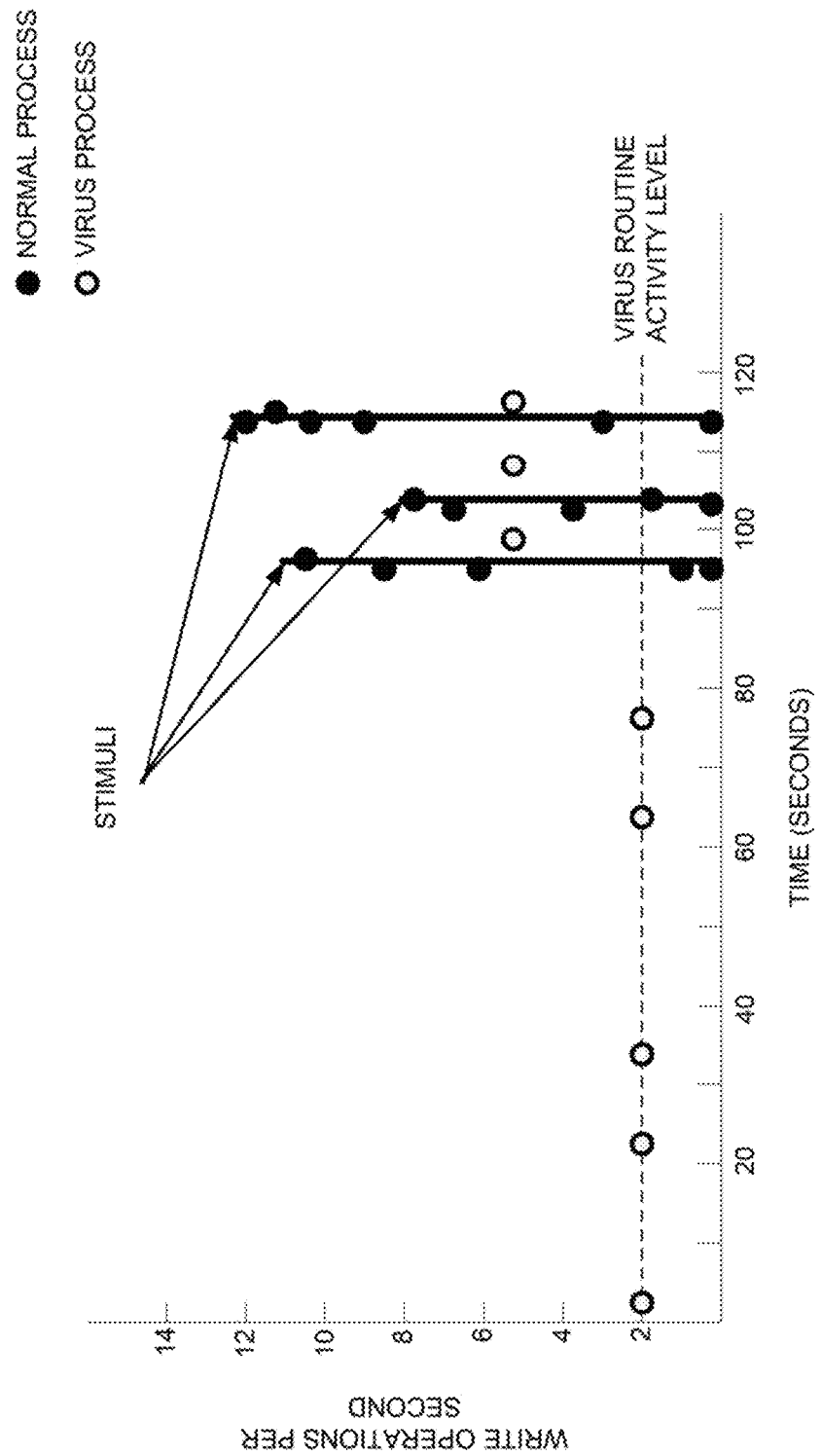
Figure 12:
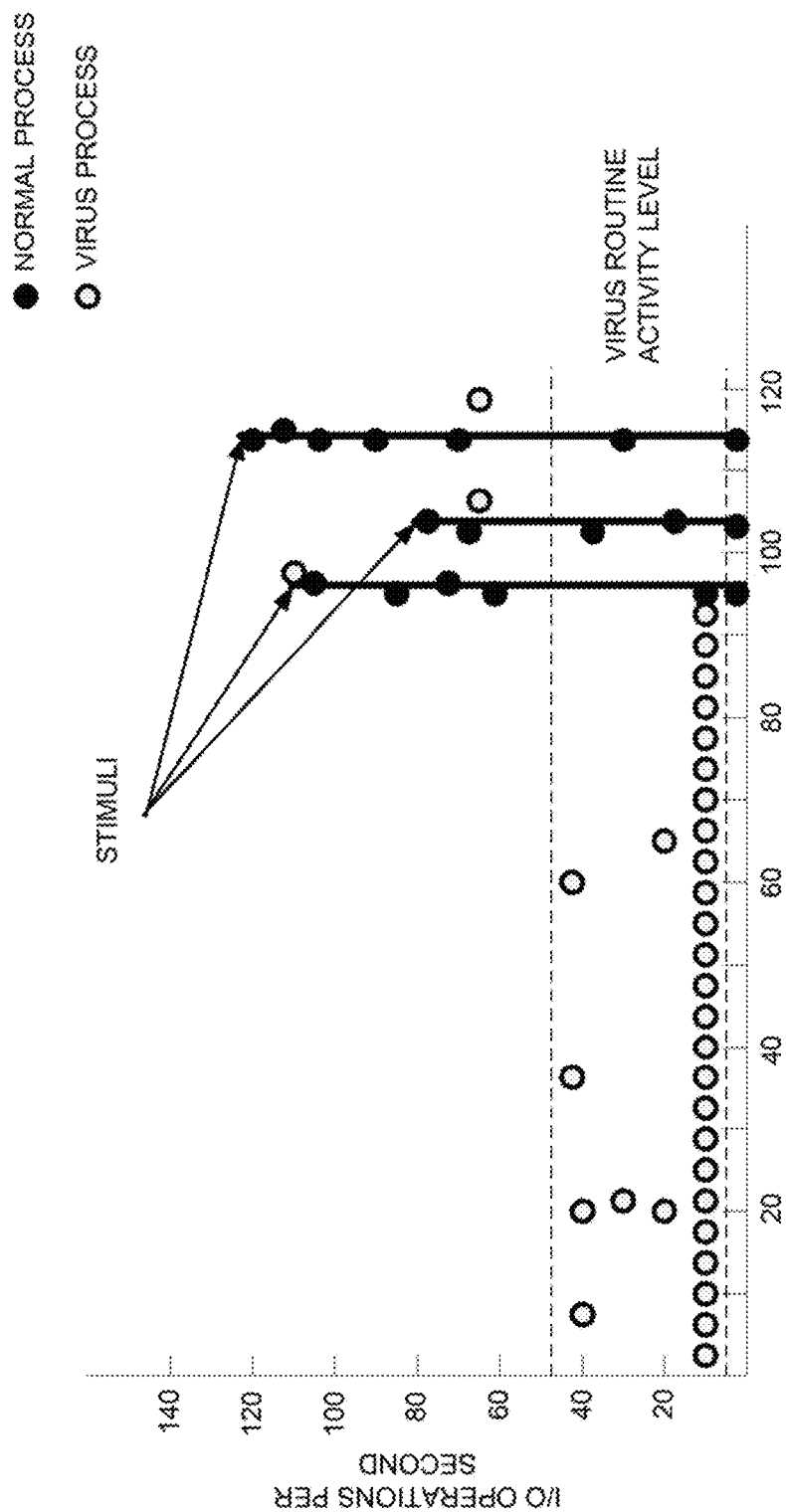

FIGS. 10 to 12 show analyses performed by an actual analysis server 112 for different triggering events and malicious applications. In particular, FIG. 10 shows a number of read operations per second. The x-axis of the graph is scaled in seconds.

In the example shown in FIG. 10, the line spikes represent triggering stimuli and the points represent malicious application 400 (e.g., virus) activity and normal read processes identified within process performance data metrics. Here, the malicious application 400 has performed a read of authentication information caused by triggering stimuli. The graph in FIG. 10 shows that the stimuli are applied at random or aperiodic intervals to avoid coincidences between background processes and the stimuli.

The points in the graph of FIG. 10 show that the malicious application 400 responds relatively quickly to the stimuli. After the stimuli are removed, the malicious application 400 returns to a dormant state. As a result of this detected relationship, the example analysis server 112 can identify malicious applications 400 by identifying patterns between multiple triggering events and which processes consistently react to these events.

FIG. 11 shows a malicious application 400 writing authentication information after occurrences of triggering stimuli. In this example, the malicious application 400 has a routine activity level that spikes after stimuli are applied by the executable application 404. FIG. 12 shows another malicious application 400 opening an Internet connection once credentials are available for export to a command and control service. Similar to the malicious application 400 in FIG. 11, the malicious application 400 in FIG. 12 has a range of routine activity that spikes after triggering stimuli occur. As a result, the analysis server 112 is capable of accurately identifying malicious applications 400 regardless of the function the applications 400 perform or their activity level on a client device 102.

Returning to FIGS. 3 and 5, once the malicious application 400 has been identified by the analysis server 112, the malicious application remover 114 identifies a location of the malicious application on the client device 102 based on the process data performance metrics in the data structure 500. The malicious application remover 114 also identifies any supporting files, libraries, etc. associated with the malicious application 400. In some instances, the malicious application remover 114 may send messages to the executable application 404 to obtain this information from the client device 102 once the malicious application has been identified.

Event F—Removal of Malicious Applications

Figure 6:
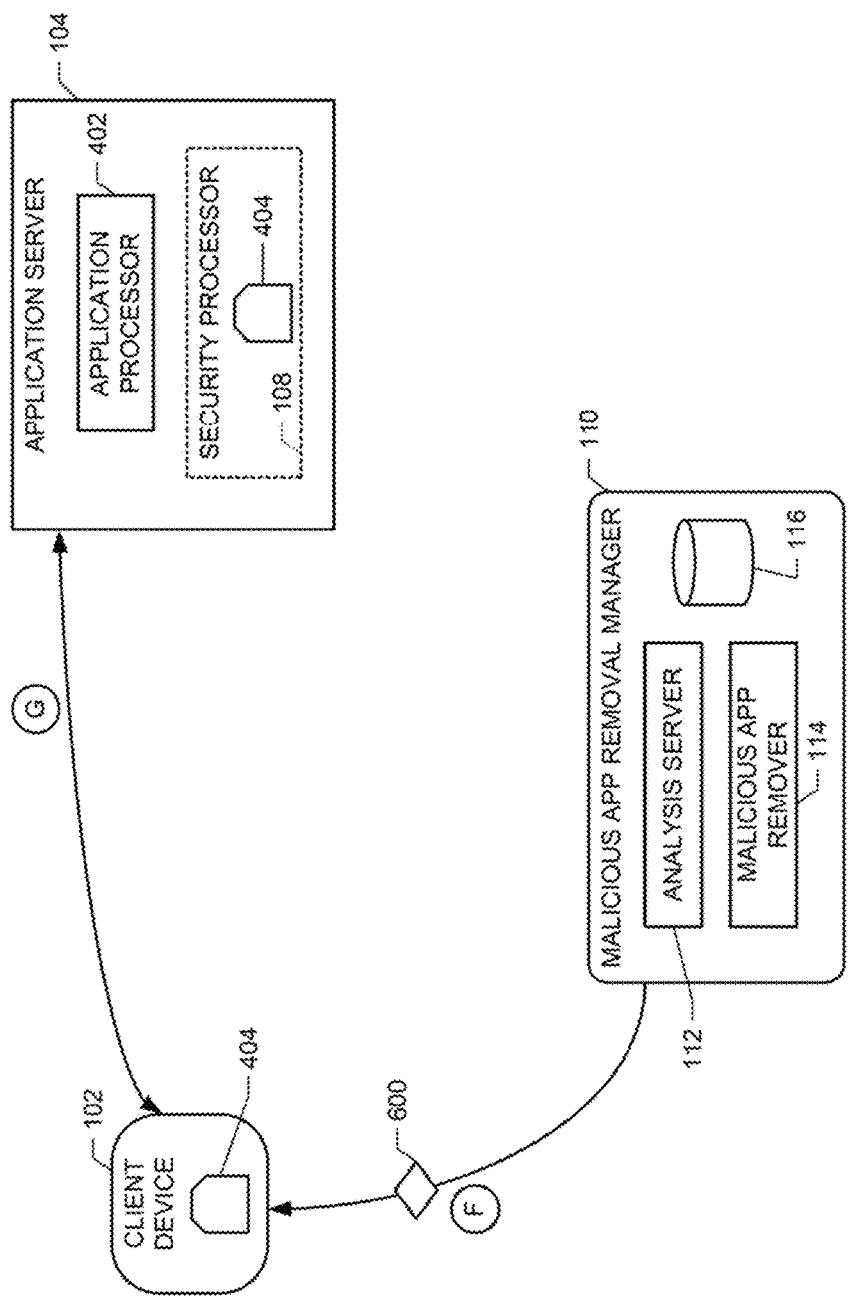

After the malicious application 400 and corresponding files have been identified, the example procedure 300 of FIG. 3 removes the application 400 at Event F. FIG. 6 shows the malicious application remover 114 sending at least one instruction 600 to the executable application 404 in the client device 102. The instruction(s) 600 may include information identifying the malicious application 400 and associated files that are to be removed or quarantined. In response to receiving the instruction(s) 600, the executable application 404 removes, substitutes, replaces, removes, overwrites, disables, quarantines, or otherwise renders the malicious application 400 inoperative.

FIG. 6 shows the malicious application 400 removed from the client device 102. To remove the application 400, the executable application 404 may use any known procedure or process. In other instances, the malicious application remover 114 may include specific instructions 600 as to how the executable application 404 is to remove the malicious application 400. This may include specific procedures for isolating and disabling the application 400 without allowing the application 400 to execute any countermeasures (e.g., replication).

Event G—Verifying the Malicious Applications were Removed

After removing the malicious application 400, the example procedure 300 of FIG. 3 continues at Event G where the executable application 404 verifies the application 400 has been removed. To verify the malicious application 400 has been removed, the example executable application 404 of FIG. 6 begins collecting process data and accesses the application server 104 to perform at least one triggering event, as described in conjunction with Event C.

The executable application 404 then transmits a data structure 500 to the malicious application removal manager 110 to determine if the malicious application 400 is functional, as described in conjunction with Event E. If the malicious application removal manager 110 determines that the malicious application 400 has been disabled or removed, the manager 110 transmits a message to the executable application 404 indicating the application 400 has been successfully removed. In some example embodiments, the executable application 404 may perform more than one verification procedure to ensure that the malicious application 400 has been removed and has not returned some time later.

Event H—Returning the Client Device to a Normal Operating State

Figure 7:
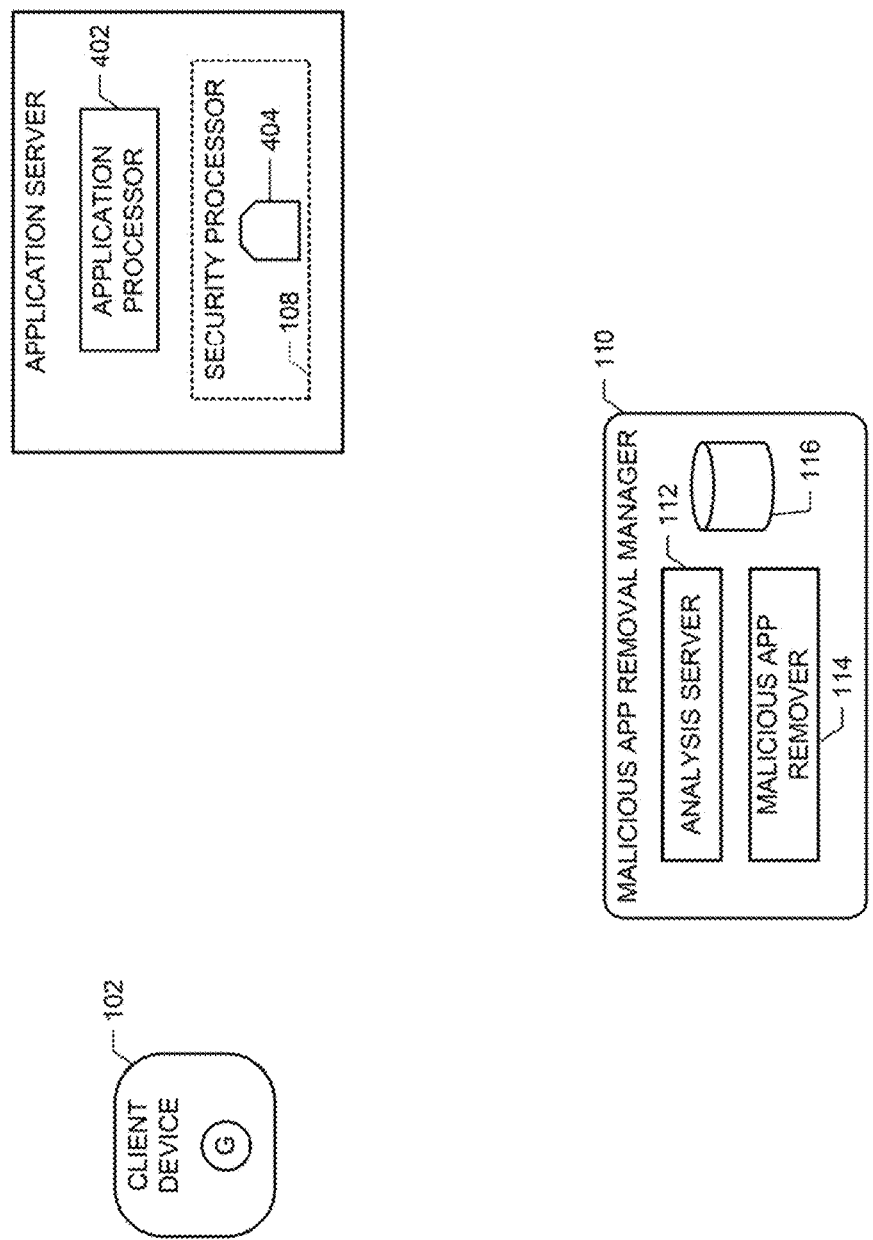

After the executable application 404 has received an indication the malicious application 400 has been successfully removed, the procedure 300 of FIG. 3 continues by the executable application 404 returning the client device 102 to a normal operating state, as indicated by Event H. As shown in FIG. 7, this includes the executable application 404 removing (e.g., uninstalling) itself from the client device 102. At this point, the client device 102 may be used normally to connect with the application server 104 shown in FIG. 7 or other application servers 104.

In other examples, the executable application 404 may remain installed on the client device 102. In these other examples, the executable application 404 may remain inactive until a message is received from a security processor 108 of an application server 104 indicating a presence of another malicious application 400 on the client device 102. Additionally, the executable application 404 may remain hidden on the client device 102 to avoid detection and corruption by malicious applications 400.

Botnet Embodiment

Figure 8:
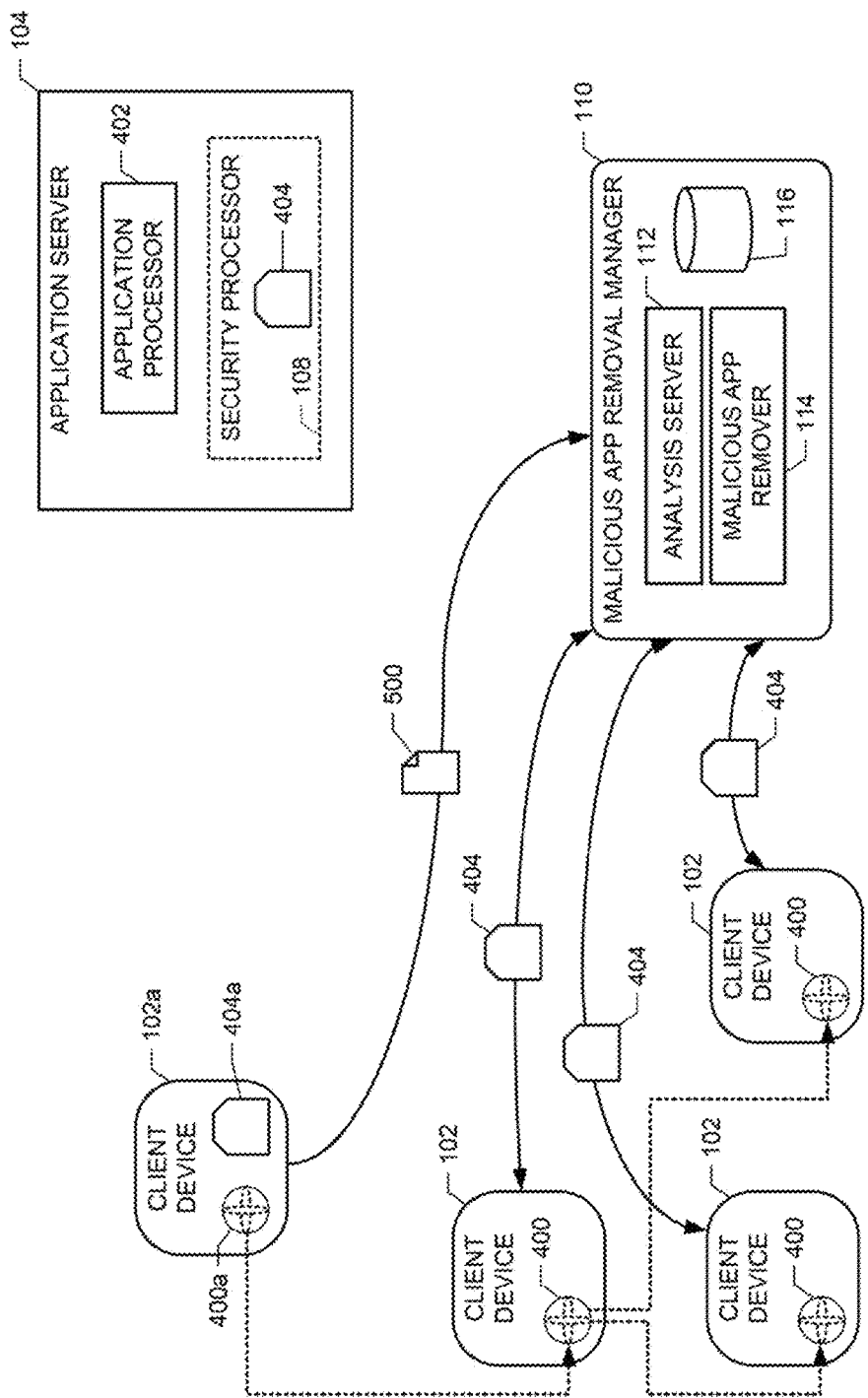
FIG. 8 shows a block diagram including an example procedure to identify and remove malicious applications from other client devices in a network, according to an example embodiment of the present invention.

FIG. 8 is a block diagram showing an example process to identify and remove malicious applications 400 from client devices 102 in a botnet infested network. In this embodiment, the executable application 404a on the client device 102a identifies an IP address to which the malicious application 400a transmits information. Alternatively, the executable application 404a may monitor a port of the client device 102a to identify IP addresses of infected peer client devices 102 that attempt to access the information provided by the malicious application 400a. In many botnets, infected peer client devices 102 may share command and control responsibility to direct the flow of stolen information and data.

In these examples, the executable application 404a includes these IP addresses within the data structure 500 that is analyzed by the analysis server 112. The analysis server 112 uses these IP addresses to identify the infected client devices 102. The analysis server 112 may then transmit executable applications 404 to each of these devices 102 to subsequently remove the malicious applications 400 as described in conjunction with Events B to H of procedure 300 of FIG. 3. In this manner, the example malicious application removal manager 110 may remove malicious applications 400 from all client devices 102 in a botnet once a single infected client device 102 has been identified.

In some instances, users of the client devices 102 may be notified about the malicious application 400 prior to downloading and installing the executable application 404. In these instances, a user may decline to install the executable application 404. If this happens, the malicious application removal manager 110 may notify application servers 104 and/or network providers about the infected client device 102. These entities may then prevent or restrict the client device 102 from accessing a network or data until the malicious application 400 is removed.

Flowchart of the Example Process

Figure 13:
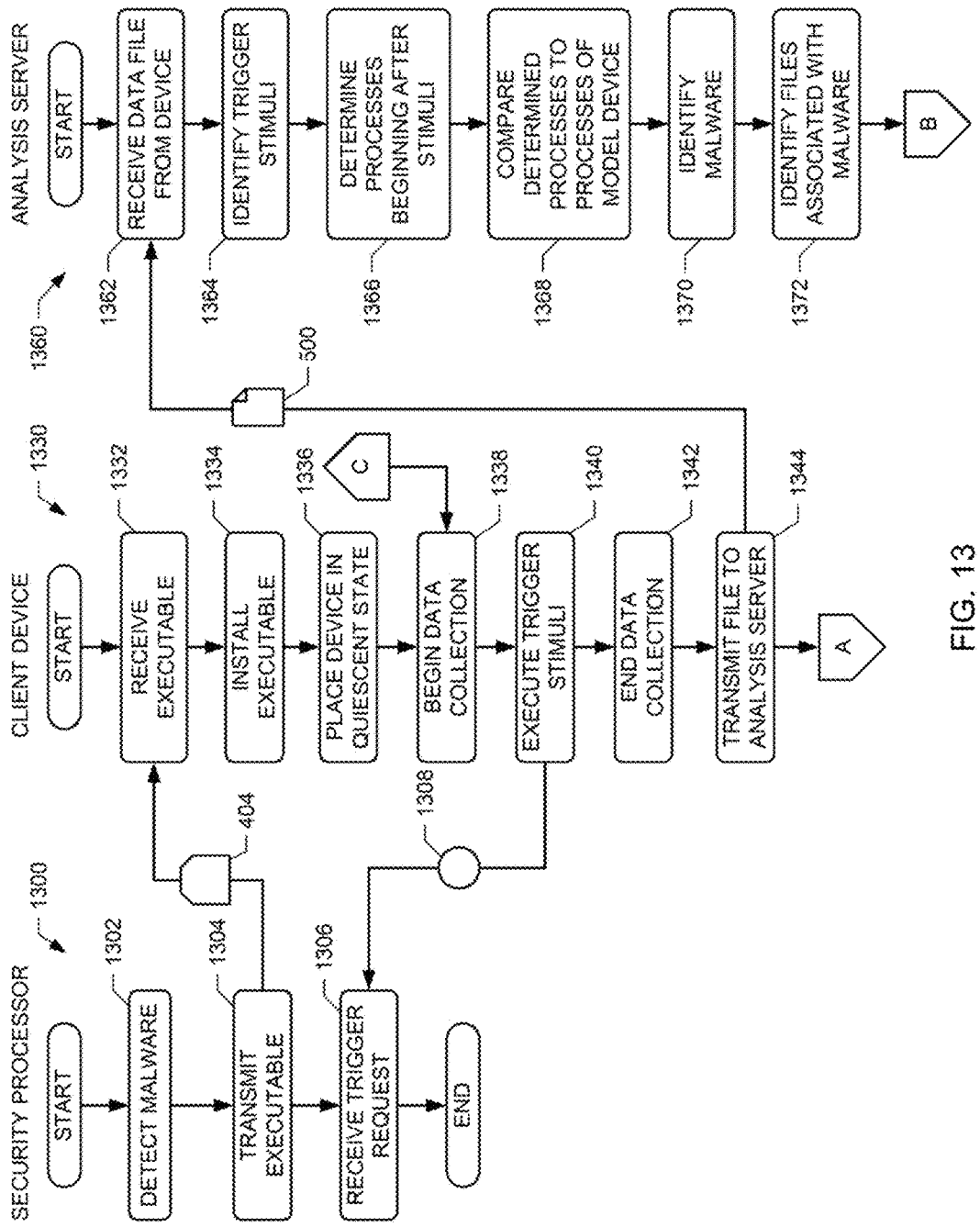
FIGS. 13 and 14 show a flow diagram including example procedures to identify and remove a malicious application, according to an example embodiment of the present invention.
Figure 14:
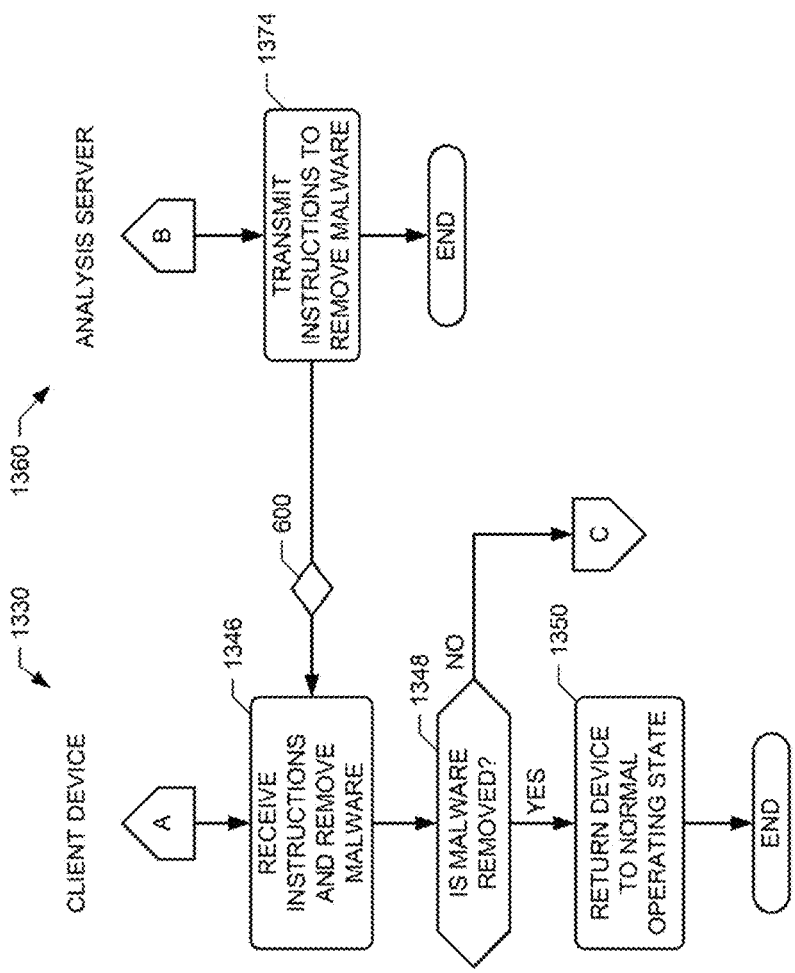

FIGS. 13 and 14 show a flow diagram including example procedures 1300, 1330, and 1360 to identify and remove a malicious application, according to an example embodiment of the present invention. The example procedures 1300, 1330, and 1360 are similar to the system level procedure 300 described in conjunction with FIG. 3. Although the procedures 1300, 1330, and 1360 are described with reference to the flow diagram illustrated in FIGS. 13 and 14, it will be appreciated that many other methods of performing the acts associated with the procedures 1300, 1330, and 1360 may be used. For example, the order of many of the blocks may be changed, certain blocks may be combined with other blocks, and many of the blocks described are optional.

The example procedure 1300 operates on, for example, the security processor 108 of FIGS. 1 and 4 to 8. The procedure 1300 begins when a malicious application (e.g., malware) is detected affecting or interfering with communications between a client device and application server (block 1302). After detecting a malicious application, the example security processor transmits an executable application 404 to the client device (block 1304).

Sometime later, the security processor may receive a message 1308 from the installed executable application 404 indicating that triggering transactions are being performed with the application server, thereby causing the security processor to inform the application server about the purpose these transactions (block 1306). As a result, the application server discards the transactions after the executable application ends the triggering stimuli. At this point, the example procedure 1300 ends until the security processor detects another malicious application.

The example procedure 1330 operates on, for example, the client device 102 of FIGS. 1 and 4 to 8. The procedure 1330 begins when a client device 102 receives an executable application 404 (block 1332). The client device 102 then installs the application (block 1334). Once installed, the executable application 404 places the client device 102 into a quiescent state (block 1336). The procedure 1330 continues by the executable application 404 beginning to collect process WINAPI performance data metrics for each of the processes operating on the client device 102 (block 1338).

The executable application 404 next executes triggering events or stimuli (block 1340). This may include the executable application 404 transmitting message 1308 indicating the purpose of the triggering events. As mentioned before, the message 1308 may be omitted in instances where the application server or the security processor can detect which transactions are associated with the executable application 404.

After executing triggering stimuli, the example process 1300 continues by the executable application 404 on the client device 102 ending the data collection and transmitting a data structure 500 storable to a memory of an analysis server 112 (blocks 1342 and 1344). At some time later, the executable application 404 receives instructions 600 from a malicious application remover 114 (block 1346). Based on these instructions, the executable application 404 removes or quarantines the malicious application (block 1346).

The executable application 404 then determines if the malicious application has been removed (block 1348). To determine if the malicious application has been removed, the executable application 404 may execute, for example, blocks 1338 to 1344. If the malicious application is not removed or quarantined, the executable application 404 returns to block 1338 and executes additional triggers to attempt to stimulate or invoke the malicious application. This may include accessing different application servers or performing different types of data operations. However, if the malicious application is removed, the executable application 404 returns the client device to a normal operating state (block 1350). The example procedure 1330 then ends.

The example procedure 1360 operates on, for example, the analysis server 112 of FIGS. 1 and 4 to 8. The procedure 1360 begins when the analysis server 112 receives a data structure 500 from an executable application 404 (block 1362). The analysis server 112 identifies triggering events or stimuli in the data structure 500 using the techniques described in conjunction with Event E (block 1364). This includes determining which processes began after the executable application 404 applied the stimuli (block 1366). This also includes comparing the determined processes with records of processes from clean devices with similar configurations (block 1368). Using these techniques, the analysis server 112 identifies the malicious application (block 1370).

The example procedure 1360 of FIGS. 13 and 14 continues by the analysis server 112 and/or the malicious application remover 114 identifying files, libraries, etc. associated with the identified malicious application (block 1372). The analysis server 112 and/or the malicious application remover 114 then transmit instructions 600 to the executable application 404 on the client device 102 to remove the malicious application (block 1374). At this point, the example procedure 1360 ends until another data structure is received from an executable application.

CONCLUSION

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus comprising:
a client device including a processor and a memory, the client device being communicatively coupled to a network; and
an executable application operating on the client device and including instructions stored in the memory, which when executed, cause the processor to:
collect data regarding processes operating on the client device during a time period,
select an application server from among a plurality of predetermined application servers that are provided as potentially triggering malicious applications,
purposefully access automatically without intervention from a user, during the time period, the selected application server via the network using a web browser on the client device in an attempt to trigger a malicious application potentially located on the client device, and
transmit, after the time period, the collected data to an analysis server to determine whether the malicious application is located on the client device.

2. The apparatus of claim 1, wherein the executable application includes further instructions, which when executed, cause the processor to select the application server based on the application server being a known intended target of the malicious application.

3. The apparatus of claim 1, wherein the executable application includes further instructions, which when executed, cause the processor to access the application server by at least one of performing a data operation with the application server, and carrying out a transaction with the application server.

4. The apparatus of claim 1, wherein the executable application includes further instructions, which when executed, cause the processor to place the client device into a quiescent state before or during the time period.

5. The apparatus of claim 1, wherein the executable application includes further instructions, which when executed, cause the processor to collect the data regarding the processes operating on the client device by receiving information from at least one of a task manager and a Windows Application Programmable Interface.

6. The apparatus of claim 1, wherein the processes operating on the client device include related performance data metrics.

7. The apparatus of claim 1, wherein the executable application includes further instructions, which when executed, cause the processor to:
start the time period for the collection of data before the access of the application server; and
end the time period after a specified number of minutes after the application server was accessed.

8. The apparatus of claim 1, wherein the executable application includes further instructions, which when executed, cause the processor to:
receive a message from the analysis server indicative of files related to the malicious application; and
remove the malicious application from operation on the client device based on the received message.

9. The apparatus of claim 8, wherein the executable application includes further instructions, which when executed, cause the processor to:
place the client device into a quiescent state before or during the time period; and
take the client device out of the quiescent state after receiving a second message, instead of the message, from the analysis server indicative that the malicious application is not present.

10. A method comprising:
operating an executable application on a client device configured to:
place the client device into a quiescent state;
collect data regarding processes operating on the client device;
select an application server from among a plurality of predetermined application servers that are provided as potentially triggering malicious applications,
access automatically without user intervention the selected application server from the client device and perform at least one data operation; and
transmit the collected data to an analysis server;
analyzing the collected data to identify a malicious application by:
determining which processes on the client device were triggered after the application server was accessed by the executable application; and
comparing the determined processes to records of processes from a device similarly configured as the client device to identify processes associated with the malicious application;
determining files on the client device that are associated with the identified malicious application; and
based on the analysis of the collected data, transmitting instructions to the executable application on the client device causing the executable application to remove the malicious application from operation on the client device.

11. The method of claim 10, wherein the executable application is configured to access the application server to stimulate the malicious application without input from a user of the client device.

12. The method of claim 10, further comprising:
prior to operating the executable application, detecting at the application server that the malicious application is affecting communications between the client device and the application server, the application server being communicatively coupled to the client device via a network; and
transmitting the executable application from the application server to the client device.

13. The method of claim 10, further comprising:
prior to operating the executable application, detecting at a second application server that the malicious application is affecting communications between the client device and the second application server, the second application server being different from the application server; and
transmitting an instruction from the second application server to the client device causing the executable application to begin operating.

14. The method of claim 10, further comprising responsive to removing the malicious application placing the client device into a normal operating state and deactivating the executable application.

15. The method of claim 10, wherein determining the files on the client device that are associated with the identified malicious application includes remotely accessing the client device and scanning a memory of the client device for files corresponding to processes of the identified malicious application.

16. A machine-accessible device having instructions stored thereon that, when executed, cause a machine to at least:
- collect data regarding processes operating on a client device;
- select an application server from among a plurality of predetermined application servers that are provided as potentially triggering malicious applications;
- purposefully access automatically the selected application server using a web browser on the client device in an attempt to trigger a malicious application potentially located on the client device;
- transmit the collected data to an analysis server to enable determination as to whether the malicious application is located on the client device;
- receive a message from the analysis server indicative of the malicious application; and
- remove the malicious application from operation on the client device based on the received message.

17. The machine-accessible device of claim 16, further comprising instructions stored thereon that are configured when executed to cause the machine to:
- store first information identifying the application server that was purposefully accessed;
- store second information identifying a time the application server was accessed; and
- transmit the first information and the second information to the analysis server to enable determination as to whether the malicious application is located on the client device.

18. The machine-accessible device of claim 16, further comprising instructions stored thereon that are configured when executed to cause the machine to:
- collect second data regarding second processes operating on the client device after the step of removing the malicious application from operation;
- purposefully accessing at least one of the application server and a second application server using the web browser on the client device in an attempt to trigger the malicious application potentially located on the client device;
- transmit the second collected data to the analysis server to enable determination as to whether the malicious application is still located on the client device.

19. The machine-accessible device of claim 18, further comprising instructions stored thereon that are configured when executed to cause the machine to:
- place the client device into a quiescent state before collecting the data regarding the processes operating on the client device; and
- take the client device out of the quiescent state after receiving a second message from the analysis server indicative that the malicious application is not present.

20. The machine-accessible device of claim 19, where in the second message is received from the analysis server after transmitting the second collected data.

* * * * *